United States Patent [19]
Ishii et al.

[11] Patent Number: 5,440,473
[45] Date of Patent: Aug. 8, 1995

[54] AC-DC CONVERTER

[75] Inventors: Masanori Ishii; Koji Arakawa, both of Kawagoe, Japan

[73] Assignee: Toko, Inc., Tokyo, Japan

[21] Appl. No.: 302,527

[22] Filed: Sep. 8, 1994

[30] Foreign Application Priority Data

Sep. 17, 1993 [JP] Japan .................. 5-254758
Feb. 21, 1994 [JP] Japan .................. 6-045078

[51] Int. Cl.$^6$ ............................................. H02M 3/335
[52] U.S. Cl. ........................................ 363/21; 363/56
[58] Field of Search .............................. 363/20–21, 363/41, 25, 34, 15, 56

[56] References Cited

U.S. PATENT DOCUMENTS 4,604,563  8/1986  Min ........................ 318/786
5,297,014  3/1994  Saito et al. ............... 363/21

FOREIGN PATENT DOCUMENTS 4-140067  5/1992  Japan .
4-61425   8/1992  Japan .

Primary Examiner—Peter S. Wong
Assistant Examiner—Aditya Krishnan
Attorney, Agent, or Firm—Dressler, Goldsmith, Shore & Milnamow, Ltd.

[57] ABSTRACT

The present invention provides an AC-DC converter in which an application range of an AC input voltage can be extended, keeping a voltage in a circuit from rising at a light load. In an AC-DC converter having a rectifier 3, a boost chopper 4 and a DC-DC converter 5, a PWM circuit 6, an one-shot multivibrator 7, a pulse synthesizer 8 and a comparator 9 are further arranged. The pulse synthesizer 8 generates a second pulse signal having a pulse width being narrower by a pulse width of the delay pulse $V_{pD}$ than that of the first pulse signal $V_{pa}$ by means of the first pulse signal $V_{pa}$ which the PWM circuit 6 output s and a delay pulse $V_{pD}$ generating in said one-shot multivibrator 7. The comparator 9 compares a voltage $V_C$ boosted up by the boost chopper 4 with a reference voltage $V_{REF}$ to stop generating the delay pulse when voltage $V_C$ drops below the reference voltage $V_{REF}$.

6 Claims, 2 Drawing Sheets

AC-DC CONVERTER

BACKGROUND OF THE INVENTION

1. Technical Field

The present invention relates to an AC-DC converter of a type having an improved power factor including means for keeping a voltage in the converter at a light load from rising.

2. Description of the Prior Art

A conventional AC-DC converter has an active filter with a boost chopper as well as a rectifier for rectifying an AC input voltage and a DC-DC converter for obtaining a stabilized DC output, by which the power factor of the converter is improved.

Previously, the applicant proposed an AC-DC converter having circuit structures shown in FIG. 1 in JP Utility Model Application No. 4-61425.

In the circuit structures shown in FIG. 1, a first switching transistor Q1 and a second switching transistor Q2 are simultaneously driven by a driving signal $v_p$ from a pulse width modulation circuit (hereinafter referred to as a PWM circuit) as the same converter driving circuit.

So far control circuits or multiplyers, and PWM circuits driving switching transistors by signals from the control circuits have been arranged independently to a DC-DC converter 5 and a boost chopper 4, respectively. However, because only a set of the control circuit or the multiplyer, and the PWM circuit can be disposed in a circuit as shown in FIG. 1, the circuit structures can be simple and a circuit device can be small in size. Also, in comparison with an AC-DC converter having two control circuits and two signal frequencies, effects that noise generated by EMI can be highly reduced are obtained by this AC-DC converter.

SUMMARY OF THE INVENTION

That the first switching transistor Q1 in the DC-DC converter 5 and the second switching transistor Q2 in the boost chopper 4 are simultaneously driven by the same driving signal means that ON periods of both transistors are the same. Accordingly, in case that a light load is connected between output terminals 2A, 2B in the circuit as shown in FIG. 1, from relationship between a power supplied to the load of the DC-DC converter 5 and a power managed in the boost chopper 4, there is a possibility that a voltage $V_C$ appearing across an output capacitor C1 in the boost chopper 4 highly rises.

For this voltage rise in the circuit, circuit components having a high withstand voltage must be used and then, the circuit becomes larger in size. In addition, it is not easy to make an application range of AC input voltage broad, e.g. so as to use for both AC 100 v and 200 v because the voltage rise in the circuit highly changes according to a value of an AC voltage inputted to a rectifier 3.

Accordingly, an object of the present invention is to provide an AC-DC converter of a type having an improved power factor which is small in size, and in which an application range of an AC input voltage can be broader by keeping a voltage in the converter at a light load from rising.

According to the invention, an AC-DC converter having a rectifier for rectifying an AC input voltage from an AC power source line, a boost chopper for boosting up the rectified output voltage of the rectifier, and a DC-DC converter for receiving a high output voltage of the boost chopper to supply a stabilized DC voltage from output terminals to a load, comprising:

a converter driving circuit for detecting an output voltage of the AC-DC converter to output a first pulse signal having a pulse width according to said output voltage; and a one-shot multivibrator for generating a delay pulse signal having a predetermined pulse width when the first pulse signal is received to generate an ON pulse of the first pulse signal, wherein the DC-DC converter is driven by the first pulse signal and the boost chopper is driven by a second pulse signal obtained by synthesizing the first pulse and the delay pulse signals, and a pulse width of the second pule signal is narrower by a pulse width of the delay pulse signal than that of the first pulse signal.

DESCRIPTION OF THE PREFERRED EMBODIMENT

Figure 1:
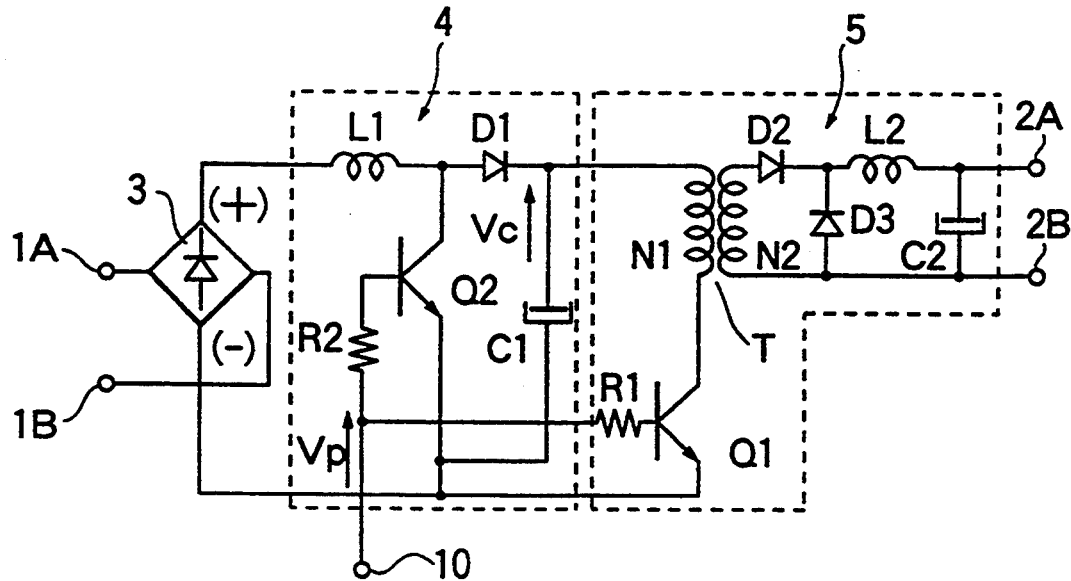
FIG. 1 shows a conventional AC-DC converter according to JP Utility Model Application No. 4-61425.
Figure 2:
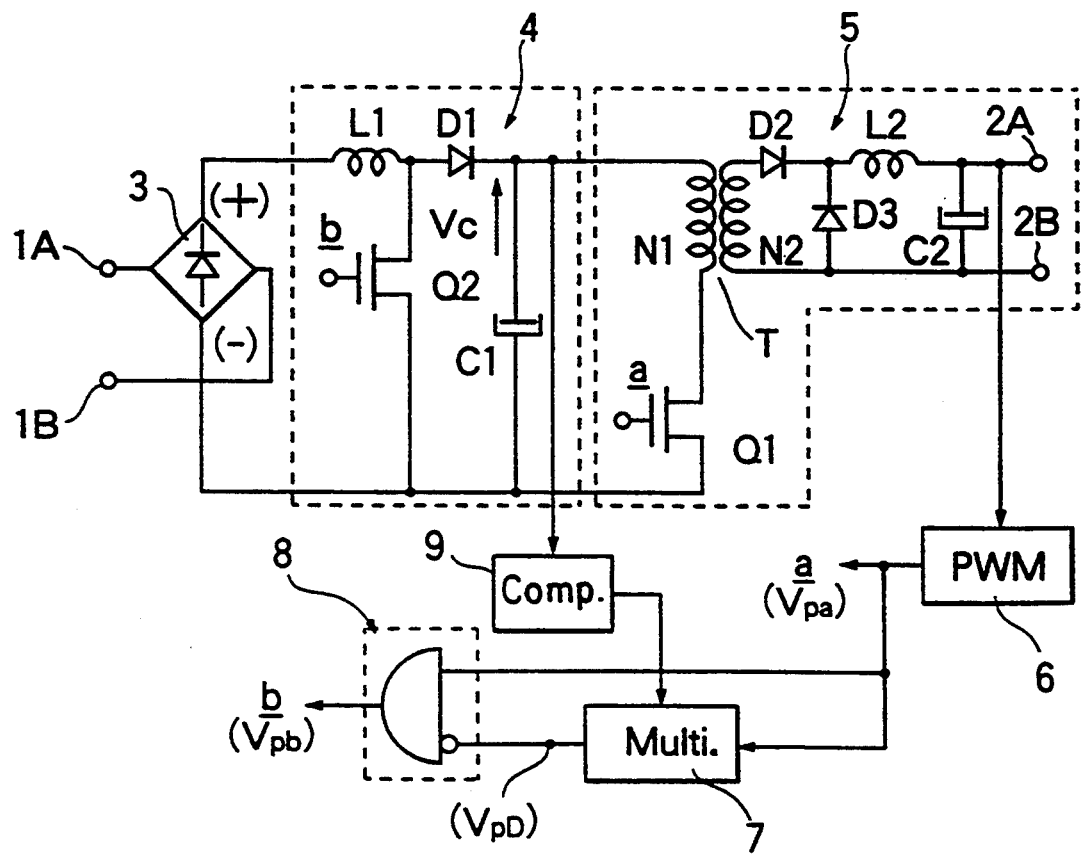
FIG. 2 shows an embodiment of an AC-DC converter according to the present invention.

FIG. 2 illustrates an AC-DC converter according to the present invention which can make an application range of an AC input voltage broad. In FIG. 2, it should be noted that the same elements as those shown in FIG. 1 are given the same reference numerals.

In FIG. 2, the AC-DC converter has circuit structures as follows.

1A and 1B are input terminals connected to an AC power supply and each of input terminals is connected to the AC input terminals of a rectifier 3. A DC positive-side output terminal of the rectifier 3 is connected to an anode of a diode D1 through a choke coil L1. A cathode of the diode D1 is connected to one end of a primary winding N1 of a converter transformer T, another end of which is connected to a drain of a first switching transistor Q1. Also, a source of the first switching transistor Q1 is connected to a negative-side output terminal of the rectifier 3.

A drain and a source terminals of a second switching transistor Q2 are connected between the anode of the diode D1 and the negative-side output terminal of the rectifier 3, and an output capacitor C1 is connected between the cathode of the diode D1 and the negative-side output terminal of the rectifier 3.

One end of a secondary winding N2 of the converter transformer T is connected to an output terminal 2B, another end of which is to an anode of a diode D2. A cathode of the diode D2 is connected to an output terminal 2A through a choke coil L2 and further, to a cathode of a flywheel diode D3. An anode of the flywheel diode D3 is connected to the output terminal 2B. A smoothing capacitor C2 is connected between the output terminals 2A, 2B.

In the circuit structures as described above, a boost chopper 4 comprises the choke coil L1, the diode D1, the second switching transistor Q2 and the output capacitor C1, and also, a DC-DC converter 5 comprises the converter transformer T, the first switching transistor Q1, the diode D2, the flywheel diode D3, the choke coil L2 and the smoothing capacitor C2.

Further, in FIG. 2, a PWM circuit 6, an one-shot multivibrator 7, a pulse synthesizer 8 and a comparator 9 are arranged as follows in order to drive the boost chopper 4 and the DC-DC converter 5.

A feedback input terminal of the PWM circuit 6 as a drive circuit for driving the AC-DC converter is connected to the output terminal 2A, and a pulse output terminal of the PWM circuit 6 is connected to a gate of the first switching transistor Q1, a pulse input terminal of the pulse synthesizer 8 and a pulse input terminal of the one-shot multivibrator 7, respectively. A connection point of the capacitor C1 and the diode D1 is connected to a voltage detection input terminal of the comparator 9, and an output terminal of the comparator 9 is connected to a control input terminal of the one-shot multivibrator 7. A pulse output terminal of the one-shot multivibrator 7 is connected to a delay input terminal of the pulse synthesizer 8.

When X is a signal inputted to the pulse input terminal and Y is a signal inputted to the delay input terminal, the pulse synthesizer 8 has a circuit structure so that an output signal of the synthesizer 8 is (X) AND (NOT (B)). An output terminal of the synthesizer 8 is connected to a gate of the second switching transistor Q2.

Figure 3:
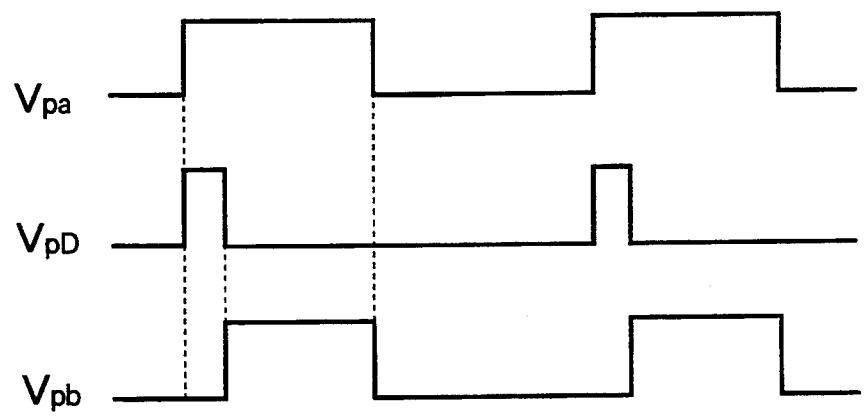
FIG. 3 shows wave forms of a first pulse a delay pulse and a second pulse signals.
Figure 4:
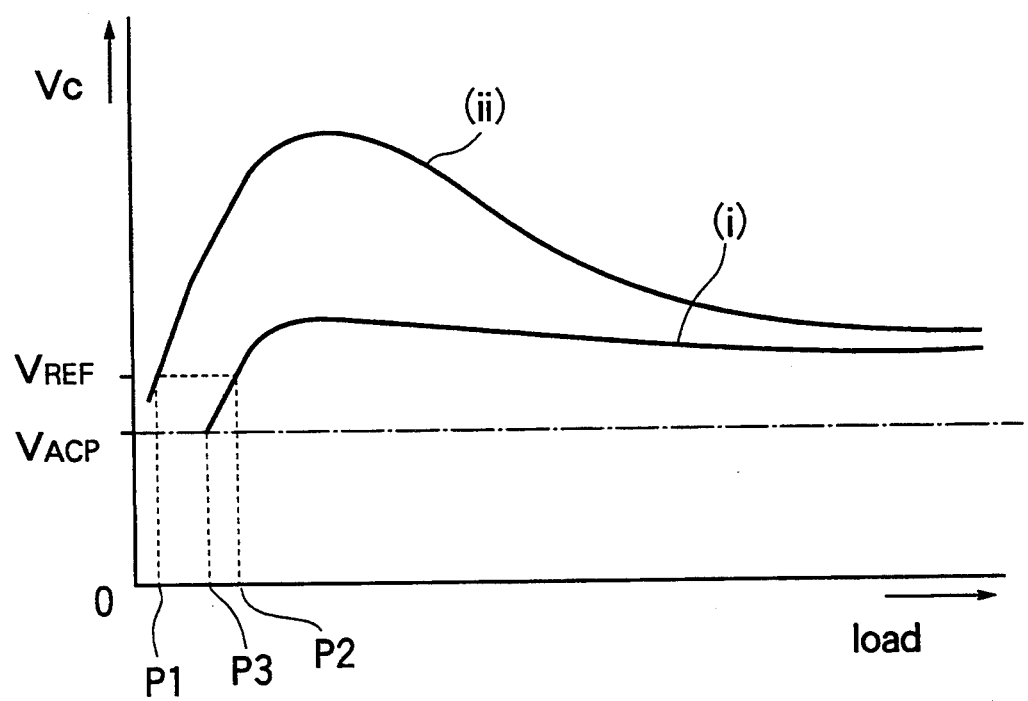
FIG. 4 shows relationship between a load state vs voltage $V_C$ across a capacitor $V_C$.

Referring to FIG. 3 and FIG. 4, control and operation of the AC-DC converter having circuit structures as described above will become apparent.

FIG. 3 illustrates each wave form of the first pulse signal $V_{pa}$ that the PWM circuit 6 outputs, the delay pulse signal $V_{pD}$ that the one-shot multivibrator 7 outputs and the second pulse signal $V_{pb}$ that the pulse synthesizer 8 outputs.

FIG. 4 illustrates, with respect to characteristic curves of the voltage $V_C$ across the capacitor C1 when a load connected between the output terminals 2A, 2B changes, a comparison of the AC-DC converter of the present invention (i) and the conventional AC-DC converter (ii).

First, in case that the load close to a rated value is connected between the output terminals 2A, 2B, the AC-DC converter as shown in FIG. 2 acts as follows.

The PWM circuit 6 outputs the first pulse signal $V_{pa}$ having the pulse width according to the output voltage to the gate of the first switching transistor Q1 to operate the DC-DC converter 5. The first pulse signal $V_{pa}$ that the PWM circuit 6 outputs is also inputted to the one-shot multivibrator 7 and the pulse synthesizer 8. The one-shot multivibrator 7 generates the delay pulse signal $V_{pD}$ having a predetermined pulse width, starting from the rising edge of the first pulse signal $V_{pa}$.

When these first pulse signal $V_{pa}$ and delay pulse signal $V_{pD}$ are inputted to the pulse synthesizer 8, it generates, as shown in FIG. 3, the second pulse signal $V_{pb}$ that may rise delaying by the pulse width of the delay pulse signal $V_{pD}$ than the first pulse signal $V_{pa}$ and may fall at the same time of falling edge of the first pulse signal $V_{pa}$. This second pulse signal $V_{pb}$ is inputted to the gate of the second switching transistor Q2 to operate the boost chopper 4.

An ON period of the second switching transistor Q2 in the conventional circuit as shown in FIG. 1 is the same as that of the first switching transistor Q1 while an ON period of the second switching transistor Q2 in the circuit according to the invention as shown in FIG. 2 is shorter than that of the first switching transistor Q1 so that as shown in FIG. 4, the voltage $V_C$ across the capacitor C1 of the present invention becomes lower than that of the conventional circuit as shown in FIG. 1.

Next, in case that a load connected between the output terminals 2A, 2B is at a light load state, the PWM circuit 6 causes the pulse width of the first pulse signal $V_{pa}$ to become narrow because of operation of stabilizing the output voltage. As described above, the pulse width of the second pulse signal $V_{pb}$ is narrower by that of the delay pulse signal $V_{pD}$ than that of the first pulse signal $V_{pa}$. Then, if the pulse width of the delay pulse signal $V_{pD}$ is constant, the pulse width of the second pulse signal $V_{pb}$ becomes relatively small, compared with the first pulse signal $V_{pa}$.

Accordingly, in the conventional circuit as shown in FIG. 1, the first switching transistor Q1 and the second switching transistor Q2 are simultaneously driven, and the voltage $V_C$ rises as the load lightens. However, in the circuit according to the present invention as shown in FIG. 2, the voltage $V_C$ does not highly rise like the conventional circuit.

When the pulse width of the first pulse signal $V_{pa}$ is narrowed by lightening a load further, a value of the voltage $V_C$ drops rapidly from a certain point of time because the pulse width of the second pulse signal $V_{pb}$ becomes relatively small. Unless countermeasure is taken for the drop of the voltage $V_C$, the pulse synthesizer 8 stops generating the second pulse signal $V_{pb}$ when the pulse width of the first pulse signal $V_{pa}$ is below that of the delay pulse signal $V_{pD}$, and the voltage $V_C$ at load P2 as shown in FIG. 4 would have been approximately equal to a peak value $V_{ACP}$ of an AC input voltage. When a large load is rapidly added while the voltage $V_C$ is kept at a value equal to the peak value $V_{ACP}$ of the AC input voltage, the pulse widths of the first pulse signal $V_{pa}$ and the second pulse $V_{pb}$ extend rapidly and as a result, there is a possibility that a large current may flow in the choke coil L1 and the second switching transistor Q2.

In the circuit as shown in FIG. 2 according to the present invention, the voltage $V_C$ is monitored by the comparator 9, and if the voltage $V_C$ becomes lower than a reference voltage $V_{REF}$ in the comparator 9, the comparator 9 outputs a control signal to the one-shot multivibrator 7, which receives the control signal to stop generating the delay pulse signal $V_{pD}$. However, if there is no delay pulse signal $V_{pD}$, the first and second switching transistors Q1, Q2 are simultaneously driven and as a result the voltage $V_C$ will rises.

Accordingly, when the load is further lightened below the load P2 at which the voltage $V_C$ becomes equal to the reference voltage $V_{REF}$, the generation and stop of the delay pulse signal $V_{pD}$ are repeated and the second switching transistor will operate intermittently. Until the load P1 is given at which the voltage $V_C$ becomes equal to the reference voltage $V_{REF}$ at a state in which the first and second switching transistors Q1, Q2 are simultaneously driven, the second switching transistor Q2 will operate intermittently, and the voltage $V_C$ can reach the approximate reference voltage $V_{REF}$ although a slight change occurs.

Therefore, because the voltage $V_C$ can be kept at a value higher than the peak value $V_{ACP}$ of the AC input voltage, a surplus current flowing in the choke coil L1 and the second switching transistor Q2 can be controlled even though a large load is rapidly added.

In the embodiment as described above, when the voltage $V_C$ across the output capacitor C1 drops below the reference voltage $V_{REF}$ in the comparator 9, the comparator 9 outputs the control signal to stop generating the delay pulse signal $V_{pD}$ of the one-shot multivibrator 7.

On the contrary, in the circuit as shown in FIG. 2, by giving the one-shot multivibrator 7 a function to change the pulse width of the delay pulse signal $V_{pD}$ in accordance with a control signal and by causing the comparator 9 to generate a control signal in accordance with a voltage value of the voltage $V_C$, the present invention is such that the voltage $V_C$ can be also controlled at an approximate constant regardless of the load condition or the AC input voltage.

Overrise or overdrop of a voltage in a circuit at a light load can be also prevented by such means, and an application range of the AC input voltage of the AC-DC converter can be extended.

The present invention has structural features that the one-shot multivibrator, the pulse synthesizer and the comparator are additionally connected to the previously proposed AC-DC converter; the first pulse signal for driving the DC-DC converter and the delay pulse generated by the one-shot multivibrator are inputted to the pulse synthesizer; there by the boost chopper can be driven by the second pulse signals, causing generating a pulse signal having a pulse width that is narrower by a pulse width of the delay pulse signal than that of the first pulse signal.

The AC-DC converter according to the present invention has advantages that the voltage in the converter is kept from rising at light load, and the application range of the AC input voltage can be extended as well as advantages that it is simple in structure, high in power factor, cheap in cost and small in size, and that noise generation of EMI is suppressed.

By preventing overdrop of the voltage in the circuit at a state close to no load, even if a large load is connected rapidly thereto, a large current can be prevented from flowing in the circuit. Accordingly, the present invention can provide the AC-DC converter with the wide application range of the AC input voltage.

We claim:

1. An AC-DC converter having a rectifier for rectifying an AC input voltage from an AC power supply, a boost chopper for boosting up a rectified output voltage of the rectifier and a DC-DC converter for receiving a high output voltage of said boost chopper to supply a stabilized DC voltage from output terminals to a load comprising:

a converter driving circuit for detecting an output voltage of the AC-DC converter to output a first pulse signal having a pulse width determined by said detected output voltage;

a one-shot multivibrator for generating a delay pulse signal having a predetermined pulse width when said first pulse signal is received to generate an ON pulse of said first pulse signal; and means for obtaining a second pulse signal by synthesizing said first pulse signal and said delay pulse signal, said DC-DC converter being driven by said first pulse signal and said booster chopper being driven by said second pulse signal.

2. The AC-DC converter of claim 1, wherein said second pulse signal has a pulse width narrower than that of said first pulse signal by a pulse width of said delay pulse signal.

3. The AC-DC converter of claim 1, wherein said AC-DC converter further includes a comparator for comparing a voltage boosted up by said booster chopper with a reference voltage to output a stop signal when said boosted voltage becomes lower than said reference voltage, and said one-shot multivibrator stops generating said delay pulse signal at a time determined by said stop signal.

4. The AC-DC converter of claim 2, wherein said AC-DC converter further includes a comparator for comparing a voltage boosted up by said booster chopper with a reference voltage to output a stop signal when said boosted voltage becomes lower than said reference voltage, and said one-shot multivibrator stops generating said delay pulse signal at a time determined by said stop signal.

5. The AC-DC converter of claim 1, wherein said AC-DC converter further includes a comparator for detecting a voltage boosted up by said boost chopper to output a control signal determined by said detected output voltage, and said one-shot multivibrator changes said pulse width of said delay pulse signal in a manner determined by said control signal to keep said boosted voltage at a constant value.

6. The AC-DC converter of claim 2, wherein said AC-DC converter further includes a comparator for detecting a voltage boosted up by said boost chopper to output a control signal determined by said detected output voltage, and said one-shot multivibrator changes said pulse width of said delay pulse signal in a manner determined by said control signal to keep said boosted voltage at a constant value.

* * * * *